United States Patent [19]

Erlenbach

[11] Patent Number: 5,037,592
[45] Date of Patent: Aug. 6, 1991

[54] PROCESS AND APPARATUS FOR MAKING A MOLDED ARTICLE FROM EXPANDABLE SYNTHETIC RESIN PARTICLES

[75] Inventor: Hans Erlenbach, Nastätten, Fed. Rep. of Germany

[73] Assignee: Erlenbach GmbH & Co. KG, Lautert, Fed. Rep. of Germany

[21] Appl. No.: 335,159

[22] Filed: Apr. 7, 1989

[30] Foreign Application Priority Data

Apr. 7, 1988 [DE] Fed. Rep. of Germany ....... 3811631
Oct. 29, 1988 [DE] Fed. Rep. of Germany ....... 3836875

[51] Int. Cl.⁵ .............................................. B29C 67/22
[52] U.S. Cl. .............................. 264/51; 264/DIG. 10; 425/4 R
[58] Field of Search ............... 264/51, 45.4, DIG. 10; 425/4 R

[56] References Cited

U.S. PATENT DOCUMENTS

| | | | |
|---|---|---|---|
| 2,954,589 | 10/1960 | Brown | 264/45.4 |
| 3,156,015 | 11/1964 | Harrison | 425/4 R |
| 3,253,064 | 5/1966 | Buonaiuto | 264/45.4 |
| 3,273,873 | 9/1966 | Stanchel | 425/4 R |
| 3,452,124 | 6/1969 | Knapp | 425/4 R |
| 3,704,081 | 11/1972 | Immel | 425/4 R |
| 3,801,244 | 4/1974 | Eisenberg | 264/45.4 |
| 3,837,769 | 9/1974 | Erlenbach | 425/4 R |
| 3,963,816 | 6/1976 | Smith | 264/53 |
| 4,233,006 | 11/1980 | Panas | 425/4 R |
| 4,327,045 | 4/1982 | Nishikawa et al. | 425/4 R |

FOREIGN PATENT DOCUMENTS 3115773 11/1982 Fed. Rep. of Germany .

Primary Examiner—Robert A. Dawson
Assistant Examiner—Allan R. Kuhns
Attorney, Agent, or Firm—Herbert Dubno

[57] ABSTRACT

To make a molded article from expandable synthetic resin particles, especially polystyrene particles, the cooling of the individual mold wall portions is effected exclusively by evaporating condensate obtained from stream, advantageously condensate which accumulates in stream compartments on the exterior or back sides of the mold walls which was fed in for heating of the mold wall portions and fusing the synthetic resin particles. This evaporation of condensate is effected on the back surfaces of the mold wall portions facing the steam compartments because of a low pressure or suction produced in the steam compartments. The condensate is fed in hot at or just below the boiling temperature of the condensate. Surfaces of the mold wall portions facing the steam compartment have increased surface area by reason of spherical surface-area increasing elements which form constricted passages between a plurality of interior reservoir cavities and the outside steam compartment.

15 Claims, 8 Drawing Sheets

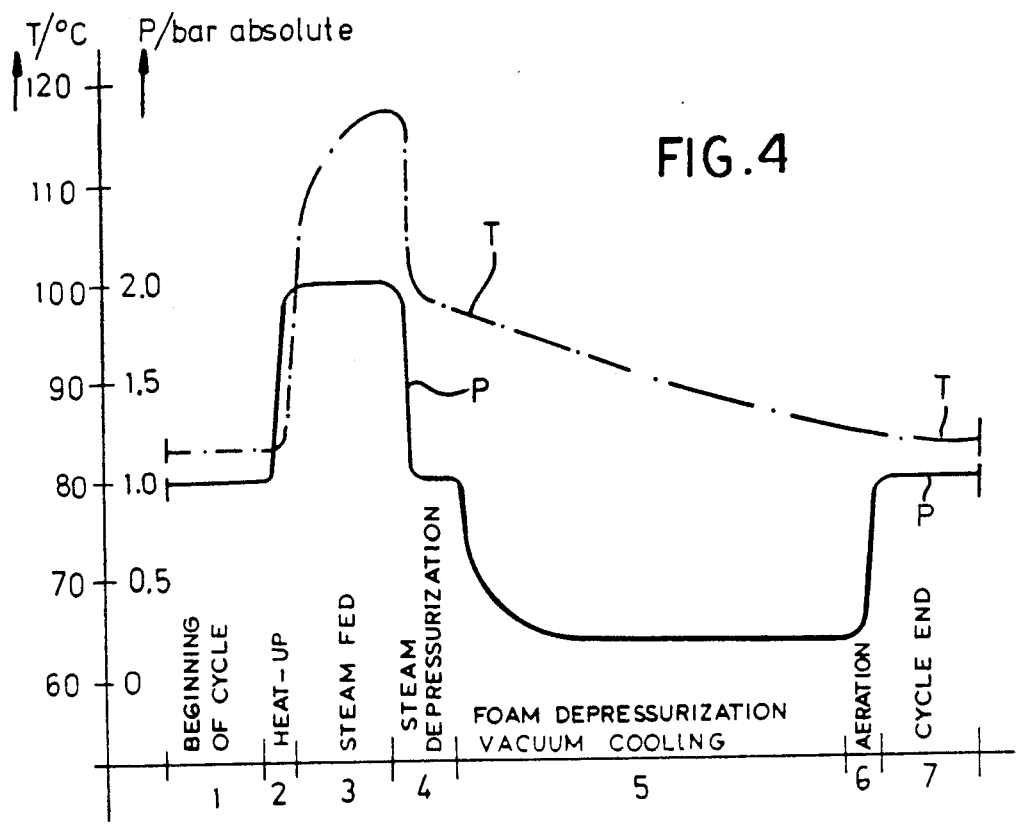
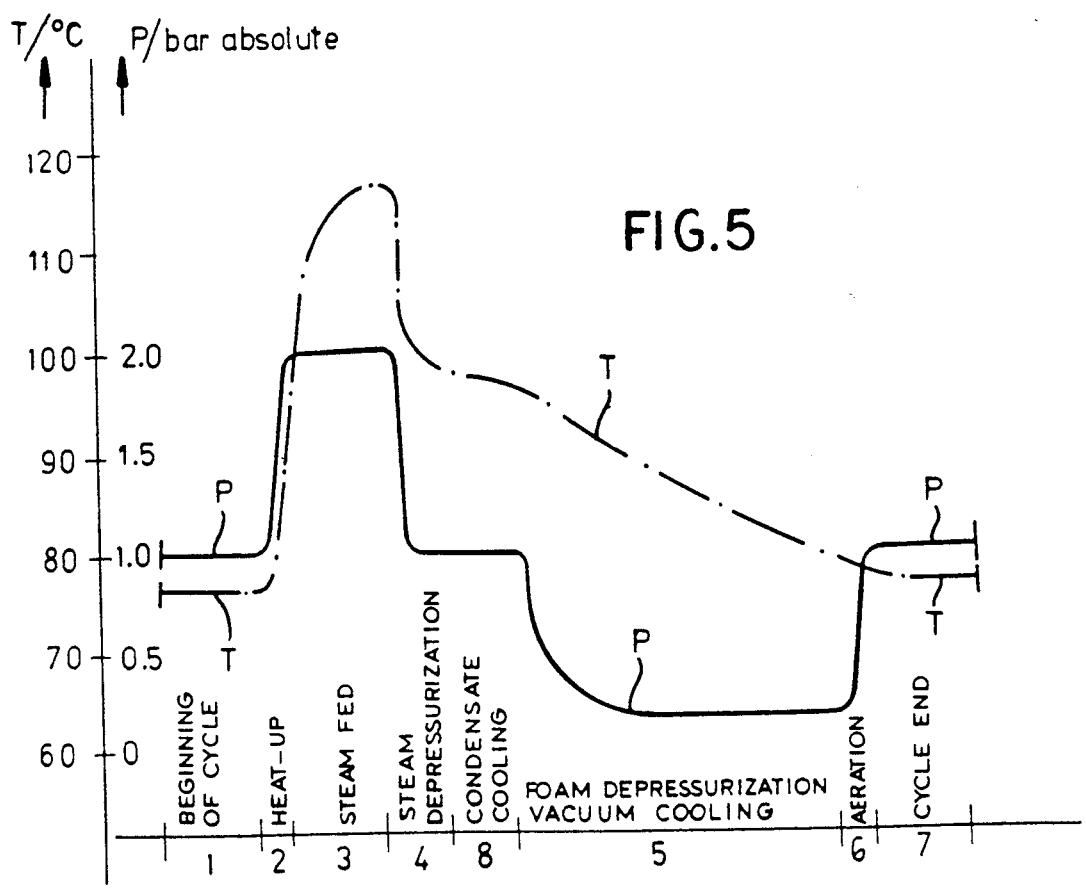

PROCESS AND APPARATUS FOR MAKING A MOLDED ARTICLE FROM EXPANDABLE SYNTHETIC RESIN PARTICLES

FIELD OF THE INVENTION

My present invention relates to a process and apparatus for making a molded article from expandable synthetic resin particles, especially prefoamed polystyrene particles.

BACKGROUND OF THE INVENTION

A molded article can be made from expandable synthetic resin particles, such as preformed polystyrene beads or pellets, by expanding the synthetic resin particles in a mold cavity of a two-part or multipart mold by application of heat and shaping or molding the synthetic resin particles against the individual mold wall portions, which are heated by hot steam fed to a steam compartment located on the exterior side of the walls, i.e. the walls of the steam chest mold. The expanded synthetic resin particles are fused together by steam fed into the mold cavity. Then the article formed in the mold is stabilized by cooling by evacuating the steam compartment and feeding in a fluid and the molded article is subsequently removed from the mold.

In the known process and apparatus the mold wall is cooled by spraying on water which should be cold or preheated water as described in German Open Patent Application 31 15 773.

The spraying of water as a coolant or as an additional medium assisting the cooling process has the disadvantage that a residue of steam used for fusing the particles making up the molded article is condensed in the molded article.

The molded article thus is removed from the mold in a moist and/or wet condition and/or with moisture or water on the surface.

The use of a coolant injected into the steam chamber or water sprayed in also has the considerable disadvantage that material contained in the water, especially calcium compounds can react with lubricants provided as layers on the particles and materials contained in the synthetic resin particles, to form thick and only very difficultly removable coatings on the back surfaces of the mold wall portion facing the steam compartment. Such coatings considerably reduce the heat transfer coefficient for heat transferred to the mold wall portion from the steam chamber and hence the thermal energy efficiency of the mold.

OBJECTS OF THE INVENTION

It is an object of my invention to provide an improved process and an improved apparatus for making a molded article from a expandable synthetic-resin, which allows a substantially improved energy efficiency in operation while also avoiding troublesome coatings on the back surfaces of a mold wall portion.

It is also an object of my invention to provide an improved process and an improved apparatus for making a molded article from a expandable synthetic-resin, which allows production of dry molded products without additional expense involved in apparatus components, time and energy.

A further object of the invention is to provide an improved method of and apparatus for making expanded and foamed polystyrene articles whereby the drawbacks of earlier techniques are avoided.

SUMMARY OF THE INVENTION

These objects and others which will become more readily apparent hereinafter are attained in accordance with my invention in a process and apparatus for making a molded article from expandable synthetic resin particles, especially polystyrene beads or pellets.

According to my invention the cooling of the individual mold wall portions is effected by evaporating condensate formed from the steam by evacuating the steam compartment and at least before the beginning of the cooling bringing the condensate to be evaporated to the back surfaces of the individual mold wall portions facing the steam compartments with a temperature, which is preferably a few degrees Kelvin below, at a maximum 10 Kelvin degrees below and is at most equal to the boiling point of the condensate at a pressure existing in the steam compartments on the mold wall back surfaces at the time of application of the condensate.

Also the steam condensate accumulating in the process can be collected and used as at least a portion of the condensate to be used for cooling the mold wall portions.

My invention is based on the fact that the evaporation of condensate at the boiling temperature or near the boiling temperature after steam leaves the steam compartment and on producing a partial suction in the steam compartment suffices to cool the mold wall to stabilize the molded article until the latter is at a point where it can be removed from the mold.

With very simple forms of the molded article and thus very simple structures for the mold wall portions, under certain circumstances, the condensate quantities collected in the steam compartment on release of the steam and thus depressurization of the steam compartment suffice to cool by evaporation the mold wall portion during evacuation of the steam compartment.

Generally, however, an additional condensate amount is fed to the back surfaces of the mold wall portions.

In every case, however, the cooling of the mold wall should be controlled for cooling the mold wall only until in the vicinity of the stabilization temperature, i.e. until the article is at a temperature at which no afterexpansion of the expandable synthetic material after removal can occur.

The mold wall remains comparatively warm even upon opening of the mold to remove the molded product. Hence, the energy expense for heating the mold in the next working cycle is substantially reduced, and moreover the required time for the operating cycle is considerably shortened.

By cooling the mold wall by evaporation of condensate collected on the back surfaces facing the steam compartment and possibly by additional condensate fed to that location during evacuation of the steam compartment a gentle beginning for the cooling process results so that the residue of steam in the porous mold body located in the mold hollow cavity still can be vaporized from it and not condensed, as may be unavoidable with rapid cooling of the mold wall portions.

Since the steam treatment of the mold body for fusing the synthetic resin particles generally is effected by nozzles mounted in the mold wall portions from the steam compartment, the steam contained in the porous molded article can be continuously withdrawn by evacuation of the steam compartment. Should, however, condensate form in the interior of the molded article, it is evaporated by the suction effectively caused by the water treatment or steam treatment nozzles acting on the molded article and produced in the steam compartment. In this way it is possible to provide a combined cooling of the molded article from its interior and from the mold wall, so that, instead of a reduced heat transfer from the wall or surface of the molded article, an effective cooling and effective drying of the molded article or product will result.

The condensate to be used except for the cooling by evaporation at the beginning of the cooling step is comparatively hot, i.e. at a temperature at or just below, i.e. at maximum 10 Kelvin degrees below, the boiling point, but considerably above the stabilization temperature of the expandable synthetic material used.

The cooling of the mold wall in accordance with the invention in contrast to the known process, no longer is effected just by application of a coolant to the mold wall surfaces. Hence, all local and indeed any hardening or sudden cooling just at the mold wall and the molded article surfaces is avoided.

The intensive fusing of the synthetic resin particles can extend to the surface regions of the molded article can continue in time until the cooling step is effected. In this way the process by my invention attain an improved fusing and thus an improved structure at the mold surfaces.

Because of the mild start up of the cooling process in connection with the use of the cooling process started in the interior of the molded article by withdrawing residual steam and steam from the condensate formed, an improved uniform structure is attained in the molded product from the interior to the surface.

The temperature of the condensate applied to the mold wall-back surfaces should advantageously be only about 1 K. to 2 K. below the boiling temperature at the pressure at which condensate boils in the steam compartment at the beginning of the cooling process. This is also true for the condensate evaporated again there and collected on the surfaces of the molded article by condensation, the condensate collected there and deposited on the back surfaces of the molded article additionally to that in depressurization of the steam compartment and condensate sprayed there on the back surfaces of the mold wall portion collected at its boiling temperature at or a few degrees Kelvin below the boiling temperature.

In one embodiment of my invention at least a portion of the condensate used for evaporative cooling of the mold wall portions is obtained by collecting and retaining the condensate condensed during the process steps of the process cycle prior to cooling on the back surfaces facing the steam compartment of some of the mold wall portions and is evaporated directly there again for cooling.

Since this collected condensate is not sufficient in most applications for the cooling process, in another feature of my invention the condensate released from the back surfaces of the mold wall portion accumulating in the steam compartments is collected and at least a portion of the amount of condensate provided for evaporation is sprayed on the back surfaces facing the steam compartment.

In case the condensate quantity in the same process cycle or a previous process cycle is not sufficient for cooling (which can occur particularly at start-up of the operation of the apparatus and/or plant), sufficient condensate should be formed from a portion of the steam produced for operation. In any case should the treated water flow, to supplement the condensate accumulating for cooling in the course of the process be larger than necessary for cooling, the condensate may be directly fed back to the steam generator without further treatment.

The condensate from the back surfaces of the mold wall portions accumulating in the steam compartments can be drawn from the steam compartment concerned and collected. During the cooling of the individual mold wall portions the temperature of this condensate can be adjusted to a temperature a few degrees below the boiling temperature, which corresponds to that pressure in the steam compartment existing on application of the condensate to the back surfaces of the mold wall portions.

The condensate is adjusted as to its temperature by a gaseous medium, advantageously steam, and is sprayed on the back surfaces of the mold wall portions to be cooled inside the steam compartment. In operation of a plurality of foam molding units the condensate released in all foam molding units can be collected centrally, processed centrally and then distributed again to the individual foam molding units. The condensate collected can be supplemented with fresh condensate produced from steam and/or processed.

To keep the temperature of the condensate sufficiently near the predetermined temperature for application of the condensate to the back surfaces of the mold wall portions, the coolant medium feed pipes are kept continuously filled at the control valves which, except during the cooling times, by circulating through a heat exchanger continuously keep the condensate at a temperature only a few degrees below the boiling temperature at a suitable pressure for spraying.

For example in making these molded articles from expandable polystyrene the individual mold wall portions can be cooled to a temperature between about 70° C. and 80° C. so that at the beginning of the cooling process the condensate is sprayed at a temperature from 98° C. to 100° C. on the back surfaces of the mold wall portions facing the steam compartment, while the absolute pressure in the steam compartment amounts to about 1 bar.

For reliable uniform distribution of the condensate on the back surfaces of the mold wall portions, the condensate to be sprayed for cooling on the back surfaces of the mold wall portions is sprayed at a pressure of from 3 to 5 bar in the steam compartment and in the steam compartment during cooling is evacuated from atmospheric pressure to an absolute pressure of about 200 mbar to 300 mbar.

The apparatus of my invention for performing the above process is based on an apparatus for making a molded article from expandable synthetic resin particles, especially prefoamed polystyrene particles, comprising a two-part or multipart mold having a mold cavity bounded by a plurality of individual mold wall portions on whose rear sides a plurality of steam compartments for heating the mold wall portions with steam are provided, means for feeding the steam to the mold cavity and means for controlled spraying of a cooling liquid.

According to my invention a plurality of back surfaces of the mold wall portions facing the steam compartments are formed with a plurality of condensatecarrying surfaces formed for holding and evaporating of condensate and spraying devices are directed at the back surfaces of the mold wall portions.

These spraying devices are connected by a condensate feed unit which provides sufficient spraying pressure to a collection and treatment unit for the condensate, while the steam compartments are connected with other devices for removal of the condensate released from the back surfaces of the mold wall portions arising thereon to provide a cooled medium to the collection and treatment unit.

The apparatus according to my invention operates especially well, has an optimum thermal and energy efficiency and a minimum cycle time, because the temperature difference between the mold temperature produced at the mold wall portions and the temperature at which the molded article is removed is only just what is necessary for the article to be formed. The apparatus according to my invention particularly saves steam so steam production is minimized.

In this apparatus according to my invention, advantageously a lower portion of at least one of the steam compartments has a condensate-collection sump used as a collecting device and at least one of the steam compartments is provided with the spraying devices pointing substantially at the back surfaces of the mold wall portions, the spraying devices being connected to the condensate-collection unit by the condensate feed unit producing the spraying pressure.

Other devices for preparing the condensate and/or adjusting the temperature, are incorporated in the condensate collection sump and/or the condensate feed mechanism.

In small plants these basic structures can provide a direct connection between the condensate-collection sump and the spraying devices of the same steam compartment or to one and the same unit.

It is also possible with large plants equipped with a plurality of foam molding units to provide a common central device for collection and preparation of condensate between the condensate collection sump of the steam compartments and the spraying devices. In the latter case in the system for obtaining condensate, collection of condensate, preparation of condensate and distribution of condensate controlled valve, devices are used which provide for maintaining the temperature of the condensate as close as possible to the temperature at the location where it is used.

Thus, for, example a condensate collection vessel connected by a condensate take off to one of the steam compartments of at least one molding machines can be provided, from which the condensate is transported by the condensate feed unit through a condensate heater in a condensate feed pipe leading to the spraying devices of the steam compartments. The condensate heater advantageously contains a heat exchanger operated by the steam. The condensate collecting in such a heat exchanger can be added to the condensate provided for the cooling.

The condensate feed can be formed as a circulation loop containing a circulating pump leading through a condensate heater, which by control valves associated with the the spraying device is connected either to the circulation loop or the condensate feed to the spraying devices.

The control valves can advantageously be valve pairs, comprising a condensate valve connecting the condensate feed pipe to the spraying device temporarily in the condensate circulation loop including the condensate return pipe and the condensate feed pipe and a steam valve temporarily opening to the spraying device to provide a feed of the steam.

Thus the circulation loop can be conducted as close as possible to the spraying orifices. An unavoidable difference of temperature between the spraying orifices and the condensate circulation loop for the condensate guided in it can be improved when the condensate feed pipe feeding away from the valve pair and the steam pipe are combined in a heat exchanging coaxial tube in which the steam pipe acts as a heating element for the condensate feed pipe.

A further improvement in operation can be obtained when the valves are controlled so that the steam valve is put into an open relationship with the condensate valve for a short time for connecting the condensate feed pipe to the condensate circulation loop. By the brief early opening of the steam valve a heat up of the condensate pipe by steam guided through the steam pipe is attained.

Furthermore in this manner the spraying orifices and the pipe segment located just upstream of them can be rinsed in a simple way with steam before feeding condensate, so that an immediate effective condensate distribution is guaranteed at the desired condensate temperature on the back surfaces of the mold wall portions.

A substantial improvement in the apparatus according to my invention can be provided When at least one mold wall portion has at least one layer of a plurality of substantially spherical surface-area increasing elements on at least one of the mold wall portions on the back surfaces of the mold facing the steam compartment for effective exchange of heat and densely packed. Hence, the back surfaces of the mold wall portions according to my invention have a layer which holds and supplies a standard value of condensate.

One might assume that this result could be obtained by roughening the back surfaces. However the back surfaces must then be so rough, i.e. the roughness depth must be so great, that a considerable cooling effect by evaporation of the held condensate is attained.

Spherically shaped surface-increasing elements, such as are advantageously provided on the back surfaces of the mold wall portions, which because of the spherical shape of the surface-increasing elements are widened at their base and have a constricted passage to the steam compartment. Thus the spherical surface-increasing elements form a structure which is comparable to that of a sponge.

These surface-increasing elements form a desirable reservoir for the condensate condensed on the relatively cool mold wall portions accumulating on heating up the mold wall portions.

The evaporation of the condensate during the heat up process is further prevented by the restricted access to the condensate receiving spaces formed in this structure. A substantially intensive and accelerated heat up process results together with the substantially larger surface of the mold wall portions relative to its steam compartment because of the surface area increasing elements, since the surfaces of the surface-area increasing elements moistened with condensate improve the heat flow of the steam to the mold wall portions during heat up.

As soon as a depressurization is effected with release of steam from the steam compartment, a second condensation is effected in the steam compartment and condensation of condensate on the back surfaces of the mold wall portions is effected. The receiving spaces or reservoir spaces between the surface area-increasing elements are filled with condensate. With evacuation of the steam compartment the condensate is evaporated from these reservoirs, so that because of the improved heat conduction properties and increase surface an effective cooling of the mold wall portions is effected.

It is particularly advantageous when the surface area-increasing elements have substantially the same dimensions. For example the surface area-increasing elements can be provided in spherical form with a diameter between 2 and 3 mm. In the interest of optimum heat conduction between the platelike portions of the mold wall portions and the surface area-increasing elements, these surface area-increasing elements can be formed in one piece with the plate portion of the mold wall portions. Advantageously the entire object can be cast in one piece.

BRIEF DESCRIPTION OF THE DRAWING

The above and other objects, features and advantages of my invention will become more readily apparent from the following description, reference being made to the accompanying highly diagrammatic drawing in which:

FIG. 4 is a graphical representation of the dependence of temperature of the mold wall portion on the pressure $P_o$ in the associated steam compartment during heating and cooling in one embodiment of the process according to my invention;

FIG. 5 is a graph of the same functional relationship between temperature and pressure as shown in FIG. 4 but in an especially desirable embodiment according to my invention;

SPECIFIC DESCRIPTION

Figure 1:
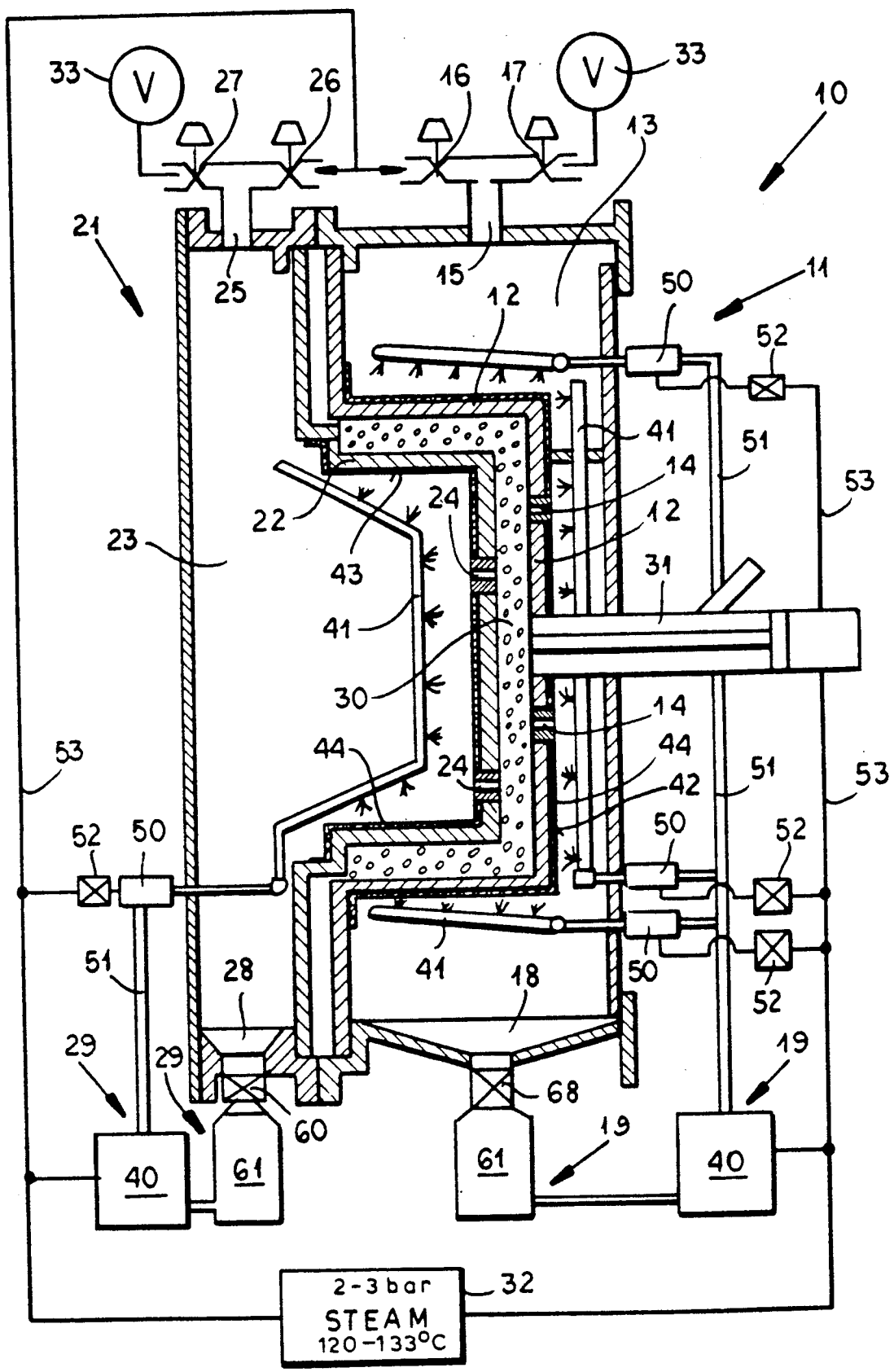
FIG. 1 is a diagrammatic cross sectional view of a steam chest mold according to my invention.

In FIG. 1 a two-part mold 10 is provided with a "cap" which comprises a one mold half 11 and a "core" which comprises a second mold half 21.

Each of these mold halves 11 and 21 contains an individual mold wall portion 12 and/or 22 and a steam compartment 13 and/or 23 on the rear or exterior side of this mold wall portion 12 and/or 22.

Orifice-like openings 14 and/or 24 are formed in the mold walls 12 and 22. Steam from the steam compartments 13 and/or 23 can enter through these orifice-like openings 14 and/or 24 into the mold cavity 30 formed between the mold wall portions 12 and 22.

Furthermore, air, steam or other gaseous media can be drawn from the mold cavity 30 into the steam compartments 13 and 23. In a conventional manner an injector 31 for the expandable, if necessary prefoamed, synthetic resin particles to be fed into the mold cavity 30 operated with pressurized air delivers them into the mold cavity 30.

Each of the steam compartments 13 and 23 is equipped with a connector 15 and/or 25. This connector 15 or 25 is connected by a steam inlet valve 16 or 26 to a steam generator 32 and by a suction valve 17 or 27 to a suction system, e.g. a suction pump 33 (which is shown twice in the drawing in FIG. 1 but in reality can be a single unit for each mold half 11 and 21).

Each of the steam compartments 13 and 23 is equipped with a condensate collection sump 18 or 28 on its lower end. A condensate collection vessel 61 is connected by a condensate shut off valve 60 to the condensate collection sump.

The collected condensate is fed from the condensate collection vessel 61 into a condensate feed unit 19 or 29. The condensate feed unit 19, 29 contains collection and treatment units 40 for the condensate In these collection and treatment units 40 a condensate heater and a pressure generator are contained among other things.

The condensate heater is advantageously formed like a heat exchanger, in which steam is used as a heat dissipating medium. The condensate accumulating in this heat exchanger from the steam can be added to the condensate drawn from the condensate collection vessel 61 of the mold halves 11 and 21 inside the collection and treatment units 40.

The condensate is brought to the desired temperature at which it should be sprayed on the back surfaces of the mold wall portions 12 and 22 in the collection and treatment unit 40. Since the spraying of the condensate should occur at a point in time during the process at which the steam compartments 13 and 23 are at standard pressure, the temperature of the condensate should be about 100° C. or a little less, e.g. 98° C. Condensate pipes 51 lead from the collection and treatment units 40 to the condensate mixing heads 50 mounted on the mold halves 11 and 21, which are operated with steam. The condensate mixing heads 50 are connected temporarily by controlled steam valves 52 to the steam pipe 53 coming from the steam generator 32. The steam valves 16 and 26 and the collection and treatment units 40 are also connected to these steam pipes 53.

The condensate mixing heads 50 feed spraying devices 41, which are mounted in the interior of the steam compartment 13 and 23 and are directed at the back surfaces 42 of the mold wall portions 12 and/or the back surfaces 43 of the mold wall portions 22.

Figure 2:
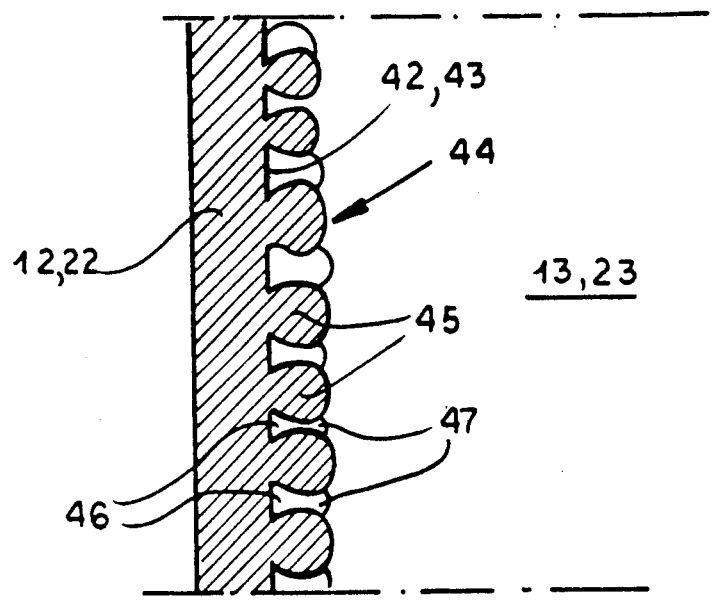
FIG. 2 is a detailed cross sectional view of a mold wall portion of FIG. 1.
Figure 3:
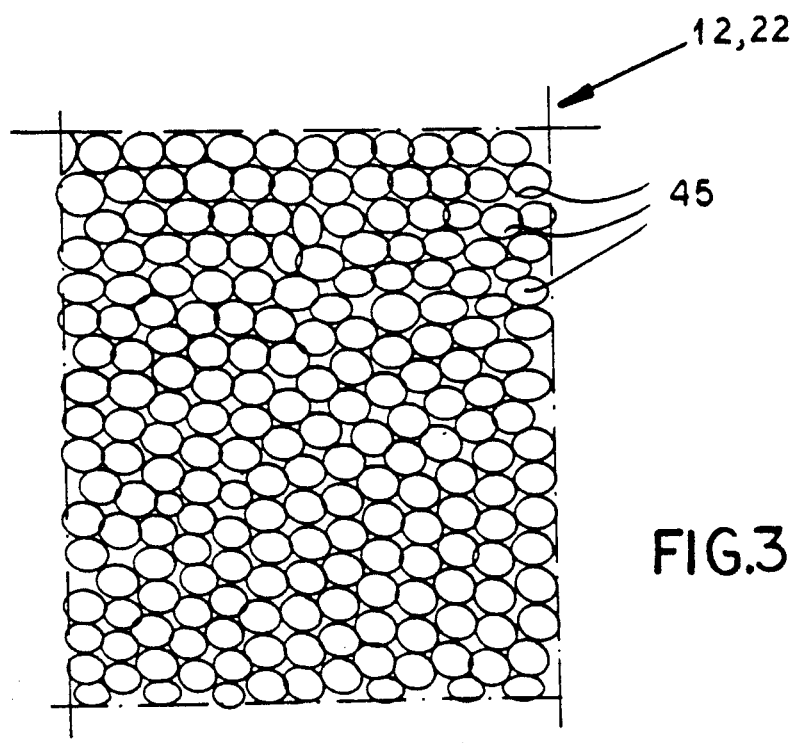
FIG. 3 is a plan view of the back surfaces facing the steam compartment of the mold wall portion of FIG. 1.

As can be seen from FIG. 1 and FIGS. 2 and 3, the mold wall portions 12 and 22 have a layer 44 made of surface area-increasing elements 45 on their back surfaces directed toward the individual steam compartments 13 and/or 23. The surface area-increasing elements 45 have a substantially globular shape and are formed in the densest possible side-by-side arrangement on the mold wall portions 12 and 22. The mold wall portions 12 and 22 together can be cast from an aluminum alloy with their surface area-increasing elements 45.

As can be seen from FIG. 2, the substantially globular surface area-increasing elements 45 form receiving spaces 46 widened at the bottom of the layer 44 for the condensate, while the passages 47 leading to the steam compartment 13 and/or 23 are constricted or narrowed. In this way a substantial surface area increase of the back surfaces 42 and/or 43 of the mold wall portions 12 and 22 relative to the steam compartment 13 and/or 23 is attained not only by a substantial surface area increase but also a highly effective reservoir space for condensate condensed on the back surfaces 42 and 43 and resulting from heating the mold wall portions 12 and 23 is provided.

The size and shape of the surface area-increasing elements 45 can vary from application to application. For molds of the above-described type, namely forms for making molded articles from expandable synthetic resin particles, the globular shaped surface area-increasing elements should have a diameter advantageously from 2 to about 3 mm.

During operation of the foam molding unit the temperature of the mold wall portions 12 and 22 in the mold 10 is adjusted so that it corresponds approximately to the stabilization temperature of the expandable synthetic material to be processed in the open mold.

In operation of the expandable polystyrene this temperature is approximately 65° C. to about 90 C., advantageously about 70° C. to about 80° C. After that the mold 10 at the temperature of the mold wall portions 12 and 22 is closed, the mold cavity 30 is filled with expandable synthetic resin particles by the injector 31, advantageously with beads made from expandable prefoamed polystyrene which can have a diameter of about 2 to about 5 mm.

As indicated in FIGS. 4 and 5 the working cycle of the machine can be divided as follows:
(1) Beginning of the cycle;
(2) Heat-up;
(3) Steam treatment of the expanded synthetic material located in the mold cavity;
(4) Steam relief (depressurization in the steam compartment);
(5) Foam pressure relief (by cooling and drawing of gaseous media from the mold cavity through the orifices 24 into the steam compartment);
(6) Venting of the evacuated steam compartment; and
(7) Removal and termination of the cycle.

After closing the mold, at startup (1) the mold cavity 30 is filled by the injector 31 with the expandable synthetic resin particles.

Subsequently the heat-up 2 of the mold wall portions 12 and 22 is effected by introduction of steam at a temperature of about 120° C. into the steam compartments 13 and 23. The mold wall portions are heated to about 115° C. The pressure of the hot steam maintained in the steam compartments can be about 2 bar, i.e. about 1 bar over atmospheric.

During the heat-up process 2 portions of the steam maintained in the steam compartments 13 and 23 at an absolute pressure of (2) bar are forced through openings 14 and 24 from the steam compartment 13 and 23 into the mold cavity 30 and into the expandable synthetic resin particles filling it. Thus an intensive heating of the synthetic resin particles and a softening of the particle surfaces is effected.

As a subsequent step then steam relief, i.e. outflow of steam from the steam compartments 13 and 23, is effected. This has the consequence that a pressure drop in the gaseous medium inside the mold cavity 30 is effected so that the expandable synthetic resin particles contained in the mold cavity 30 are momentarily strongly expanded and their surfaces are fused together or heat sealed.

The synthetic resin particles contacting on the surfaces of the mold wall portions 12 and 22 facing the mold cavity 30 are shaped against the mold wall surfaces and hence a smooth surface of the molded article results.

During the heating step (2) of mold wall portions 12 and 22 and during the steam treatment step (3) water is formed as a condensate on the back surfaces 42 and/or 43 of the mold wall portions 12 and 22 facing the steam compartments 13 and/or 23. This condensate occupies the hollow receiving spaces 46 between the surface area-increasing elements 45 and is stored there.

In the steam treatment step (3) also condensate is formed in the interior of the mold cavity and/or in the fill of expandable synthetic resin particles present therein.

After the steam pressure-relief step (4) an evacuation of the steam compartment 13 and 23 then is effected from ambient pressure to about 200 to 300 mbar (absolute pressure), so that the foam pressure relief (5) is effected.

On evacuation of the steam compartments 13 and 23 steam is drawn from the mold cavity 30 and from the porous molded article through the openings 14 and 24 so that possibly the condensate formed there is evaporated and is drawn away as steam. After expanding and fusing the synthetic resin particles thus a considerable cooling from the interior of the article molded in the mold cavity is effected.

In the embodiment of the process according to my invention illustrated in FIG. 4 the condensed water received in the hollow receiving spaces 46 between the surface area-increasing elements 45 is evaporated simultaneously with the evacuation of the steam compartments 13 and 23. Hence, a cooling of the mold wall portions 12 and 22, which leads approximately to the stabilization temperature of the expandable synthetic resin at about 85° C., is effected by evaporation from the surfaces of the surface area-increasing elements 45.

This procedure can be accomplished with a very simple mold, which does not require a high stability for the foamed synthetic resin material.

In most applications, especially in making of objects with complementary form, condensate supplied and forced in the receiving spaces 46 in the heat-up step (2) cannot produce sufficient cooling by evaporation. Then the process illustrated in FIG. 5 can be used, in which an additional condensate-delivery step (8) is used between the steam pressure relief step (4) and the evacuation of the steam compartment and/or the foam pressure relief step (5).

In this condensate-delivery step (8) steam condensate is applied to the back surfaces 42 and/or 43 of the mold wall portions 12 and 22 by spraying in steam.

The condensate applied is approximately at its boiling temperature or 1 or 2 K. degrees below it at a pressure corresponding to that in the steam compartments 13 and 23. Thus no cooling of the mold wall portions 12 and 22 by withdrawing caloric heat by a cooling medium is effected, as is apparent from the horizontal course of the temperature curve T in this region in FIG. 5.

Instead of this, however, by application of condensate heated almost to the boiling temperature a complete filling of the receiving spaces 46 formed between the surface area-increasing elements 45 and a moisturizing treatment of the entire surface of the surface-area increasing elements 45 with hot condensate is called for. The evaporation of the condensate is effected then with evacuation of the steam compartments 13 and 23, also on conducting the foam pressure relief step 5, which leads to cooling of the mold wall portions 12 and 22 so that at the end of the foam pressure relief step (5) they assume a temperature of about 78° C.

By a combination of cooling the molded article from the interior and from the cooled mold wall portions 12 and 22 at the end of the foam pressure relief step a reliable stabilization of the molded article is provided.

In the venting step (6) then the steam compartments 13 and 23 are again vented so that in final step (7) the mold opens and the molded product can be removed.

Figure 6:
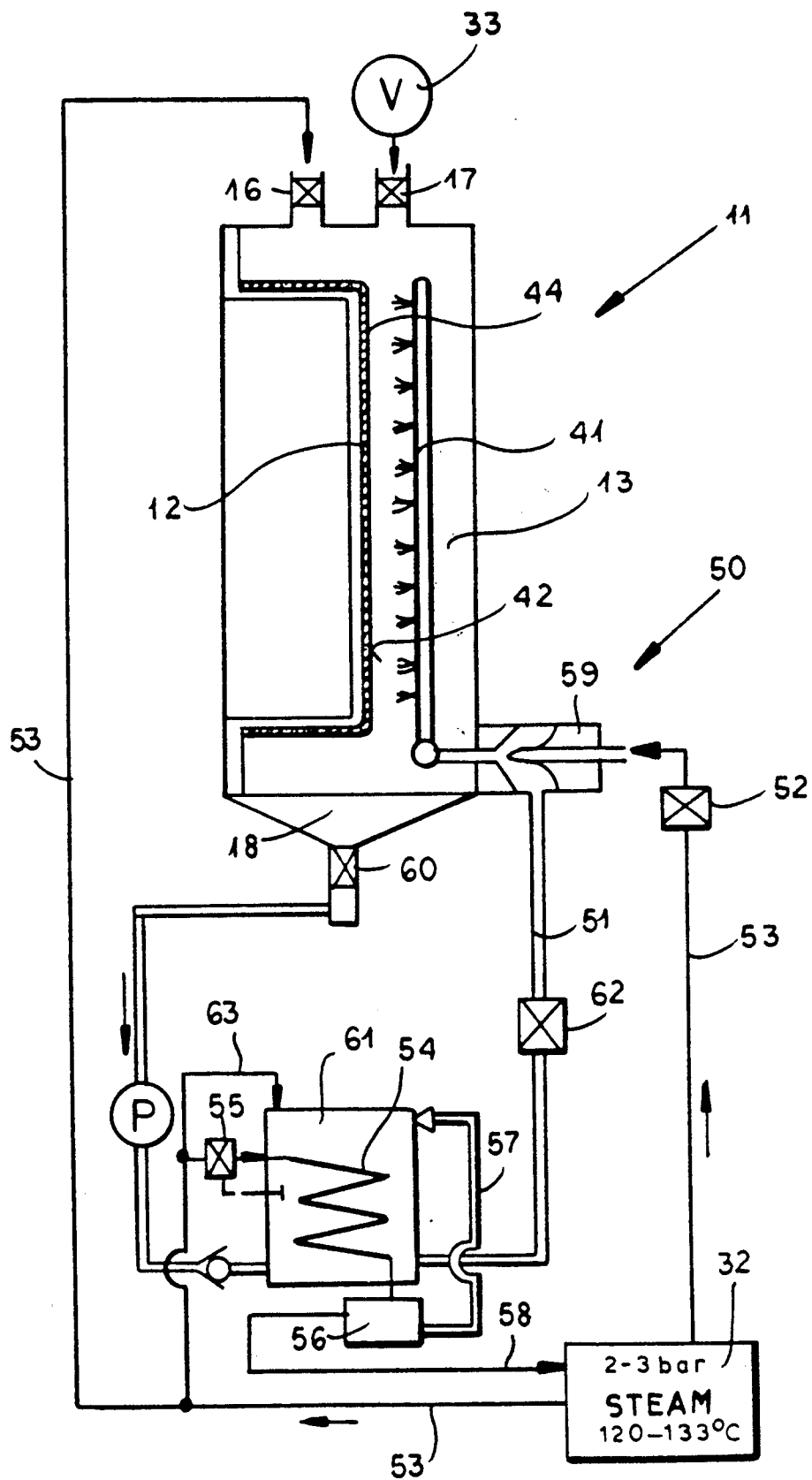
FIG. 6 is a schematic diagram of an embodiment of an apparatus according to my invention provided for a single mold.

In FIG. 6 a simple embodiment of the collection and treatment unit 40 and the condensate feed unit 19 in use on one mold half 11 is shown. As in FIG. 1 the mold half 11 is equipped with a steam inlet valve 16 and a suction valve 17. Thus the steam inlet valve 16 is also equipped with a valve configuration for steam relief of pressure until the pressure is at atmospheric pressure or normal pressure (1013 hPa), while the suction valve 17 is also provided with devices for venting of the steam chamber 13.

The mold wall portion 12 used in the mold half 11 is provided on its back surfaces 42 with a layer 44 made from surface-area increasing elements.

The back surfaces 42 of the mold wall portions 12 are positioned opposite an spraying device 41 and are supplied with a condensate-steam mixture from a condensate mixing head 50 driven by steam mounted on the mold half 11.

In its lower portion the mold half 11 has a condensate collection sump 18, which is connected with a condensate collection vessel 61 by condensate shut off valve 60 and a condensate pipe with a feed pump P and a nonreturn valve.

The condensate collection vessel 61 forms together with the elements combined with it and contained in it a condensate feed unit in the collection and treatment unit 40 for the condensate.

In the condensate collection vessel a heat exchanger 54 supplied with steam which can be made from a snaked tube or pipe (i.e. coil). This heat exchanger 54 is connected to the steam pipe 53 coming from the steam generator 32 by a temperature-controlled steam valve 55. The temperature control of the steam valve 55 is indicated in FIG. 6 only by a temperature sensor placed in the condensate collection vessel 61.

In practice moreover a device for adjustment of the desired condensation temperature, e.g. between 98° C. and 100° C. is provided.

The condensate formed in the heat exchanger 54 is obtained in a condensate separator 56 and is transferred into the condensate collection vessel 61 by a condensate return pipe 57. The residual steam leaving the condensate separator 56 is fed back in this example by a steam return pipe 58 to the steam generator 32.

The valve 62 is controlled so that it is open only during the time interval 8 indicated in FIG. 5. Besides valve 62 a condensate mixing head 50 is provided to feed the condensate fresh steam. A timed controlling steam valve 52 is used in the portion of the steam pipe 53 leading to the condensate mixing head 50, which is open only during the time interval 8 according to FIG. 5.

Figure 7:
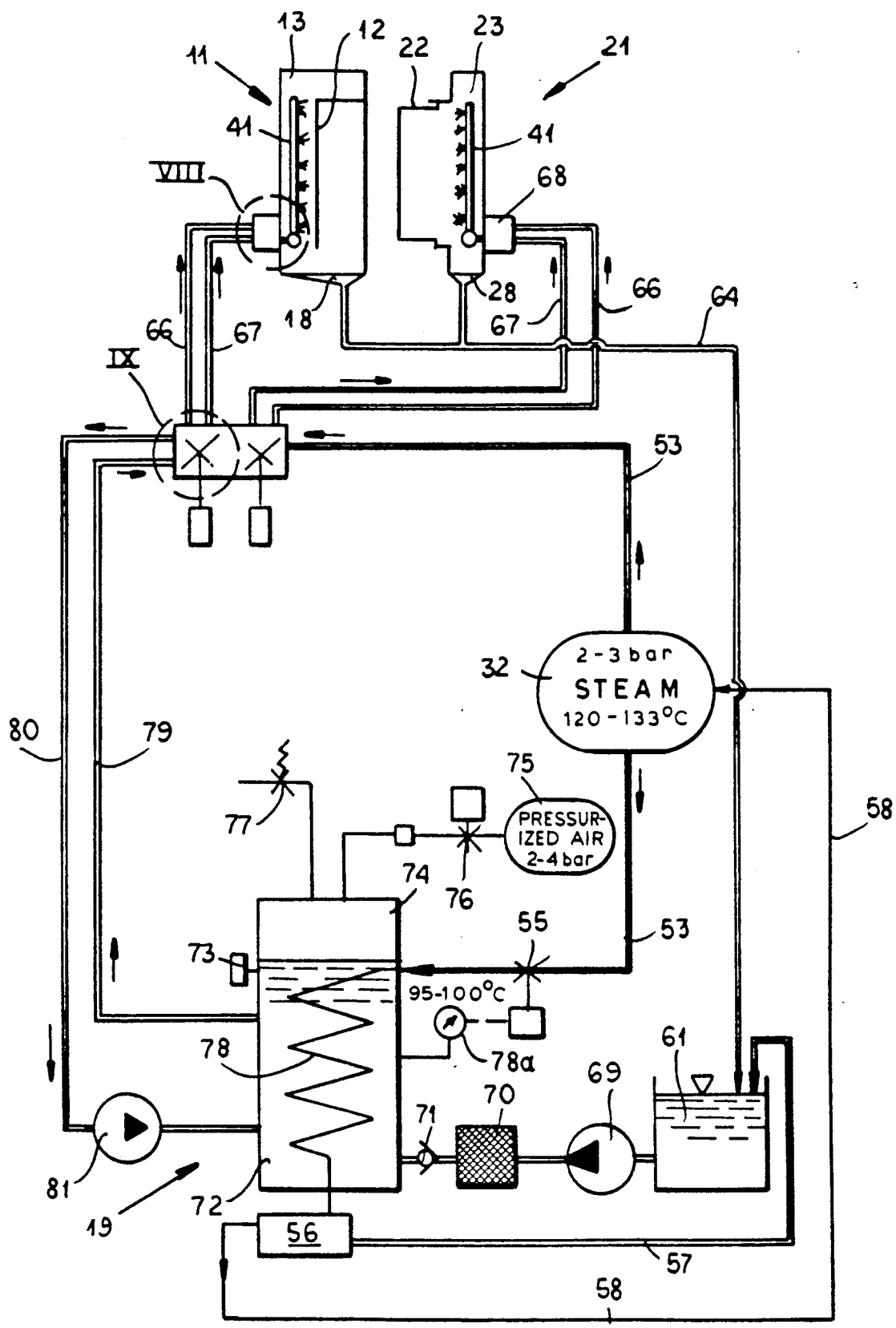
FIG. 7 is a schematic diagram of an embodiment of an apparatus according to my invention for several foam molding units.
Figure 8:
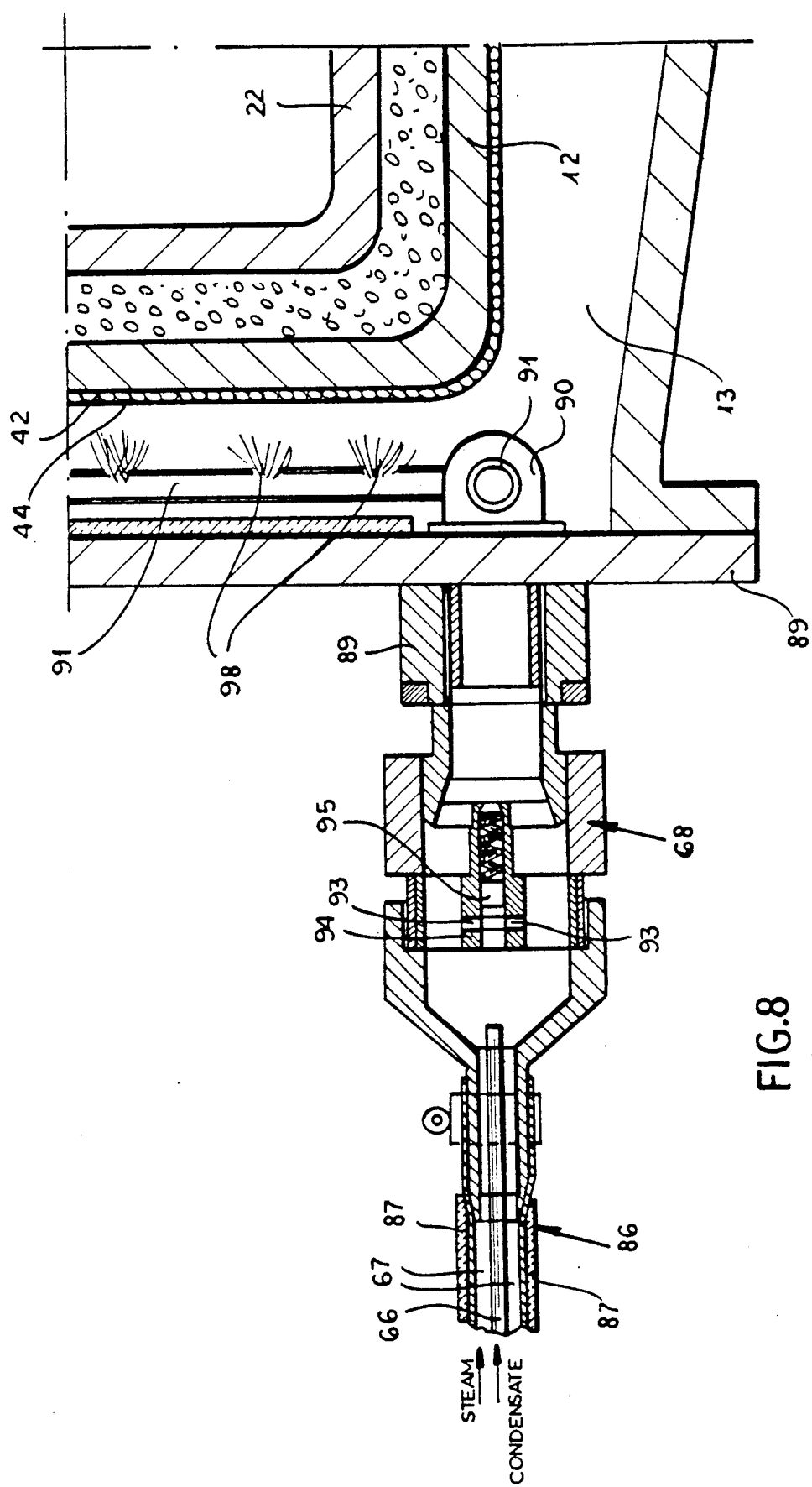
FIG. 8 is a detailed view of the portion of the apparatus of FIG. 7 indicated by the circle VIII.
Figure 9:
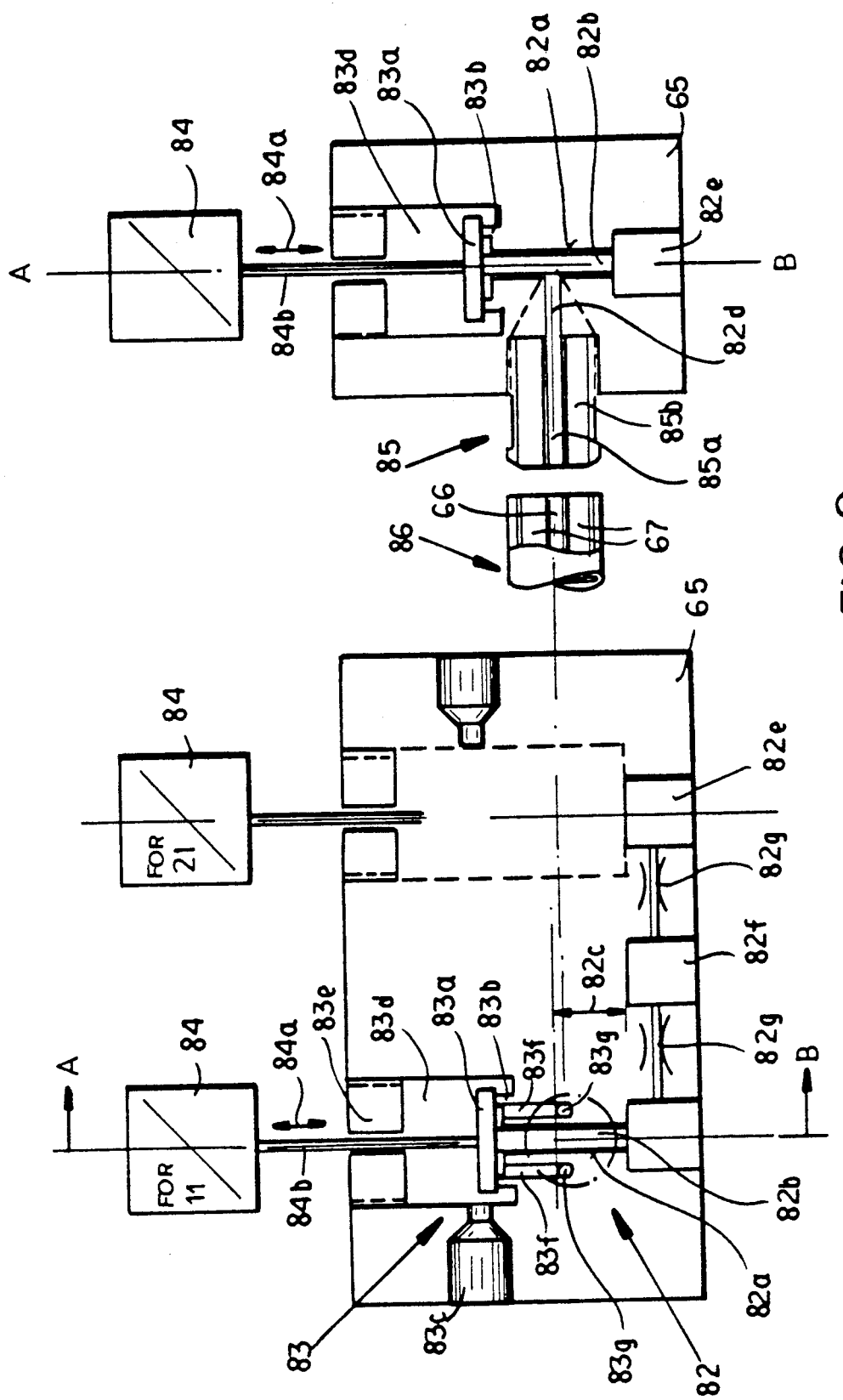
FIG. 9 is a detailed view of the portion of the apparatus of FIG. 7 indicated with the circle IX.

One advantageous embodiment for the condensate feed unit (19 or 29) with the collection and treatment unit for the condensate is shown in FIGS. 7 to 9. In this embodiment—apart from the control valves and the condensate sprayers—the condensate feed unit and the collection and treatment unit for the condensate are built centrally for a plurality of foam molding units, as is illustrated by the dot-dash line separating the lower portion of FIG. 7.

In the upper portion of FIG. 7, which shows the portion having the foam molding unit, both mold halves 11 and 21 are illustrated schematically The mold half 11 contains the mold wall portion 12 and the steam compartment 13 located under it, in which spraying device 41 directed at the back surfaces of the mold wall portion 12 is mounted. Similarly the mold half 21 contains the mold wall portion 22 and the steam compartment 23 mounted below it, in which similarly a spraying device 41 directed against on the back surfaces of the mold wall portion 22 is mounted.

The mold half 11 has a condensate collection sump 18 in its lower half and the mold half 21 has a condensate collection sump 28 in its lower portion. A condensate take off 64 leads from both condensate collection sumps 18, 28 to a central condensate collection vessel 61.

Each connected foam molding unit (upper part of FIG. 7) is equipped with a single valve block 65, which contains the required valves, to feed the required condensate and steam to the spraying device 41 in the pressure compartment 13 and/or 23 of the mold halves 11 and/or 21.

The valves provided in the valve block 65 for the mold half 11 are illustrated schematically in FIG. 9. The same valves are also present in the valve block 65 for the mold half 21.

A condensate feed pipe 66 and a steam feed pipe 67 lead from the valve block 65 to the beginning of each spraying device 41. A mixing and spraying head 68 for the treated condensate and steam is provided at the entrance to the spraying device 41. The mixing and spraying head 68 is illustrated in detail in FIG. 8.

The central condensate feed unit 19 with collection and treatment unit for the condensate has a condensate collection vessel 61, from which the collected condensate is forced into a condensate heater through a feed pump 69 and a condensate filter 70 and a nonreturn valve 71.

The feed pump 69 is controlled by a level probe 73 mounted on the condensate heater 72. It switches on as soon as the level in the condensate heater 72 drops below the height of the level probe 72.

An air cushion 74 is maintained in the upper portion of the condensate heater 72, which is formed by feeding in pressurized air from a pressurized air source 75 through a pressurized air valve 76 and is completely freshened from time to time. The pressurized air source 75 and the pressurized air valve 76 can be detached temporarily from the condensate heater 72 by suitable decoupling devices.

Finally the condensate heater 72 has a safety valve 77 on its upper portion. The pressure maintained in the air cushion amounts to about 2 to 4 bar.

In the interior of the condensate heater 72, a heat exchanger 78, e.g. in the form of a coiled snakelike pipe, is mounted, which is supplied by a central steam generator 32 with steam at a pressure between 2 bar and 3 bar and a temperature between 120° C. and 133° C. by a temperature-controlling steam valve 55. The steam valve 55 is connected to a temperature probe 78a for the condensate contained in the condensate heater. At this temperature probe the desired condensate temperature is set, e.g. 95° C. to 100° C.

The outlet of the heat exchanger 78 is connected to a condensate separator 56, from which a condensate return pipe 57 leads to a condensate collection vessel 61 and a steam return pipe 58 to a steam generator 32.

A condensate supply pipe 79 and a condensate return pipe 80 lead to and from the condensate heater 72 to the valve block 65. A circulating pump 81 is used in the condensate return pipe 80 so that a condensate recirculation is provided between the central condensate heater 72 and each valve block 65. In this cycle the condensate is kept at a desirable condensate temperature, about 95° C., advantageously about 100° C., and at a pressure between 2 and 4 bar. A steam duct 53 leads from the central unit further to the valve block 65.

In FIG. 9 the valve block 65 is illustrated schematically in two-part cross sections and of course in a left partial cross section in a plane common for both valve pairs, while in a right partial cross section a cross section in an axial plane A-B at right angles to the cross section plane shown on the left is illustrated.

As is indicated in FIG. 9 a valve pair is provided in the valve block 65 for each mold half 11 and 21, so that the valve pairs provided for the mold half 21 only is indicated as a dashed block. Each valve pair 82, 83 contains a condensate valve 82 and a steam valve 83 and is provided with a common operating mechanism 84.

The steam valve 83 has a valve disk 83a which seals tightly on a ringlike valve seat 83b in the closed position. The steam inlet 83c leads to a steam compartment 83d, inside which the valve disk 83a is movable in the direction of the double arrow 84a by the operating rod 84b between the closed position and the completely open position of the valve pair 82, 83, e.g. until at the inner side of the valve cap 83e.

Steam ducts 83f lead from the bottom surface of the valve compartment 83d forming the inside of the ringshaped valve seat 83b to the connecting passages 83g to a connector pipe 85 forming the valve outlet and of course to its outer ringlike duct 85b. The coaxial pipe 86 described in connection with FIG. 8 and indicated in FIG. 8 is connected to this connector pipe 85.

The steam valve 82 has a valve pin 82b guided tightly sealed in a valve passage 82a. This valve pin 82b is attached centrally on the sealed side of the valve disk 83a so that the operating motion of the valve disk 82a calls for a suitable axial motion of the valve pin 82b in the direction of the double arrow 84a.

An outlet duct 82d in an axial space 82c opens into the valve passage 82a, while the end of the valve passage 82a correlated with the free end of the valve pin 82b and facing the steam compartment 83d opens into the condensate inlet 82e.

The outlet duct 82d leads to the interior duct 85a of the connector pipe 85 and from there into the central condensate feed duct of the coaxial pipe 86.

To keep the condensate continuously circulating as indicated in FIG. 7 between the valve block 65 and the condensate heater 72, an additional condensate outlet 82f is provided and connected with both condensate inlets 82e by passages, advantageously throttling passages 82g. The condensate supply pipe 79 shown in FIG. 7 is connected to the condensate inlet 82e, while the additional condensate outlet 82f is connected with the condensate return pipe 80 shown in FIG. 7.

The operation of the valve pairs is as follows:

In the condition or state shown closed in FIG. 9 both the condensate feed pipe 66 and also the steam feed pipe 67 are closed at the appropriate inlets. If, however, the valve disk 83a is pushed from its ringlike valve seat 83b, the steam arrives in the steam duct 83f and from there by the connecting passage 83g in the outer ringlike duct 85b of the connector pipe 85 and from there into the steam feed pipe 67 of the coaxial pipe 86 and from there into the mixing and spraying head 68 and thus into the connected spraying device 41.

The outlet duct 82d of the condensate valve 82 is however shut off from the condensate inlet 82e, until the free end of the valve pin 82b has been brought behind the axial space 82c and thus has opened the entrance in the outlet duct 82d in the valve passage 81a. Opposite to the action in closing the valve pair 82, 83, next the entrance of the valve passage 82, 83 to the outlet duct 82d is covered by the valve pin 82b. Thereafter the free end of the valve pin 82b is moved over the axial space 82c and the valve disk 83a reaches the ringlike valve seat 83b.

In this way before the feed of the condensate to the spraying device 41 a thorough rinsing of the mixing and spraying head 68 shown in FIG. 8 and the connected parts of the spraying device 41 with steam is effected. After shutting off the condensate feed, an after-rinsing of the mixing and spraying head 68 and the connected parts of the spraying device 41 is effected. The duration of the prerinse and after-rinse with steam is determined by the operating speed of the valve pair with the established size of the axial space 82c and may be correspondingly set or adjusted in the operating mechanism.

The use of two-part separate valve pairs 82, 83 and separate operating mechanisms 84 for both mold halves has the significance that the feed of condensate to the back surfaces of the mold wall portions in the different mold halves is different. This is necessary because of the different molding process and because of the fact that much steam from the steam compartment of the one mold is fed into the mold cavity in moisturizing the material to be worked, is forced through the material contained in the hollow cavity and is received from the steam compartment of the other mold half.

Because of the operation of the foam molding unit different feed times for the condensate to the back surfaces of the mold wall portions provided in the different mold halves are required. For example a condensate feed time of 3 sec can be provided for the mold half 11 provided as a cap portion and a time of 1 sec for the condensate feed can be provided for the mold half 21 acting as core portion. Different feed times and temporal displacement of the feed for condensate permit optimum adjustment for all applications by optimal temporal control of both operating mechanisms 84.

As indicated in FIG. 8 the condensate feed pipe 66 leading to the mixing and spraying head 68 from the valve block 65 and the steam feed pipe 67 are formed as flexible coaxial tubes 86 with an exterior heat insulating layer 87.

In the coaxial tube, the condensate feed pipe 66 is centrally positioned while the steam feed pipe 67 surrounds it. In this way heat loss in the condensate between the valve block 65 and the mixing and spraying head 68 is prevented.

The mixing and spraying head 68 is formed as a plug-in unit and is mounted on an input connector 89 on the rear wall 88 of the steam compartment 13. A connecting piece 90 leads from the connector 89 into the interior of the steam compartment 13. Laterally and upwardly directed condensate-distributor pipes, advantageously copper pipes, are mounted on this connecting piece 90, which have sprayer orifices 92 directed against the back surface 42 and/or on the layer 44 on it.

The plug-in like mixing and spraying head 68 at the outlet of the condensate feed pipe 66 contains a distributor head 94 provided with radially oriented outlet ducts 93, which contains interiorly a spring-loaded nonreturn valve 95.

The condensate is forced into the ringlike flow space for the steam through the outlet ducts 93 on opening the nonreturn valve 95. The mixture of condensate and steam issues then through the connector 89 into the distributor pipe 91 and from there through the sprayer orifices 92 in finer form to the back surfaces 42 of the mold wall portions 12 and/or to the layer 44 found there.

As soon as the pressure on the condensate cuts off, the nonreturn valve 95 closes so that no steam can be forced back into the condensate line, the condensate feed pipe 66 is kept continuously in the state filled with condensate.

Figure 10:
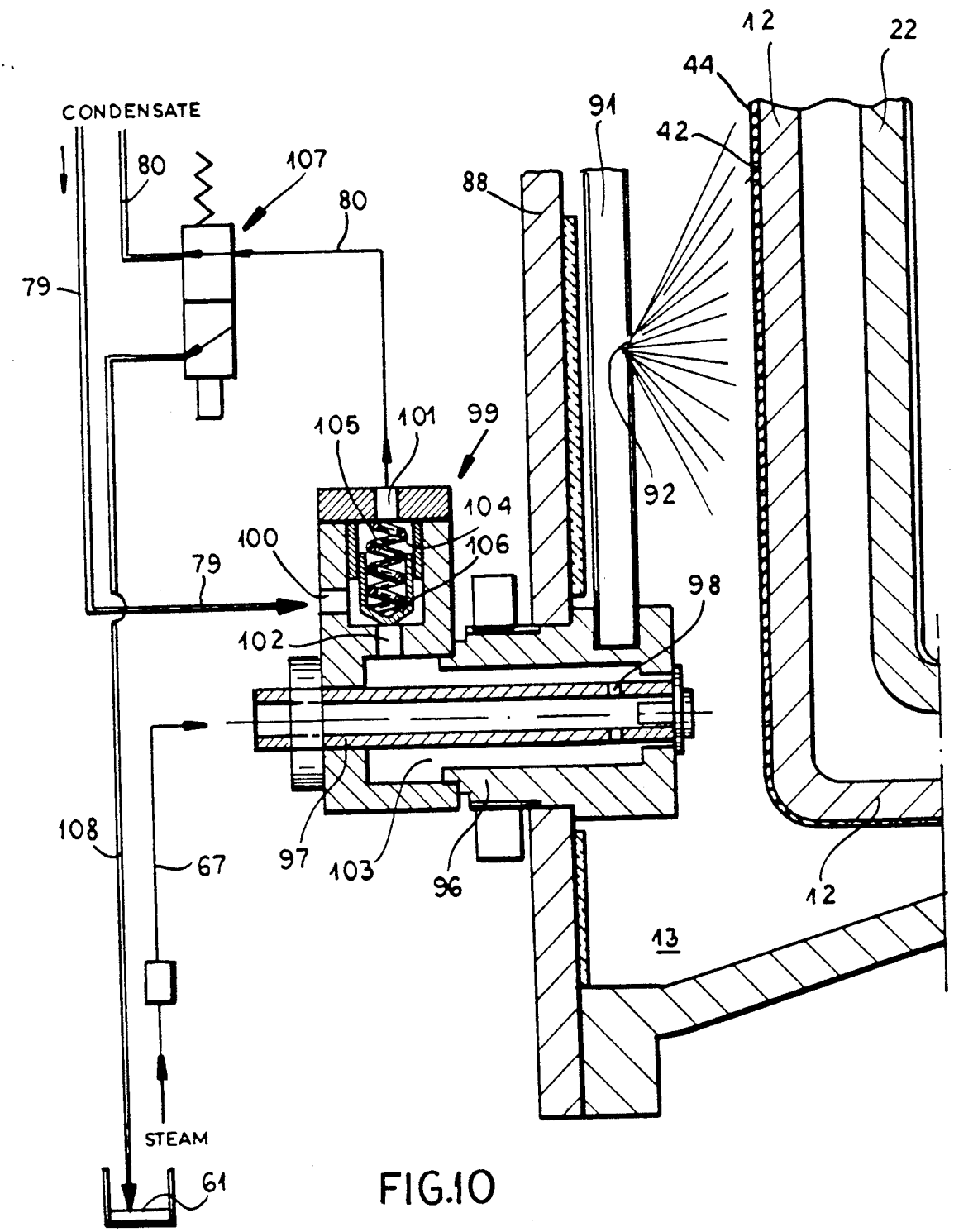
FIG. 10 is a diagram showing a valve arrangement modified with respect to FIG. 7.

A modified embodiment is illustrated in FIG. 10. In that embodiment a valve and spraying head 96 is mounted on the rear wall 88 of the steam compartment 13. A steam feed pipe 97 extends axially through the valve and spraying head 96 and has sprayer orifices 98 located opposite the connected spraying or spraying pipe 91.

The steam feed pipe 97 is connected to a steam feed pipe 67, in which a timed steam valve 52 is mounted. A condensate inlet valve 99 is put on the valve and spraying head 96, which has a lateral connector 100 for the condensate supply pipe 79 and an axial connector 101 for the condensate return pipe 80.

The condensate inlet valve 99 is connected with the circular space 103 of the valve and spraying head 96 surrounding the steam feed pipe 97 by an inner axial passage 102.

The condensate inlet valve 99 contains a sleeve-like valve body 104 which is cone-like on its front end, which is pressed by a spring 105 in the passage 102. The valve body has throttle passages 106 in its circumference, which lead to axial connector 101 from lateral connector 100 through the interior of the valve body 104 in the closed valve.

In the condensate return pipe 80 a control valve 107 is inserted, which is connected in its standard position with the extension of the condensate return pipe 80, also provides a condensate circulation from the condensate supply pipe 79 to the condensate return pipe 80 through the condensate feed valve 99.

The control valve 107 is brought into a configuration in which the return pipe is connected with a pressurized condensate duct 108 leading to the condensate collection vessel 61 (compare FIG. 7) to spray a condensate water mixture on the back surfaces 42 of the mold wall portions 12 and/or a layer 44 on these back surfaces.

The excess pressure arising at the lateral connector 100 hence relative to the condensate at the connector 101 has the effect that the valve body 104 is lifted from the passage 102 against the force of the spring 105. Hence, condensate issues into the circular space 103 at the pressure in it.

Simultaneously also the steam valve is open so that the mixture of condensate and steam is transferred into the slotted pipe 91 and sprayed from the sprayer orifices 92.

On reversing the control valve 107 into the standard configuration shown in FIG. 10 the pressure arising in the condensate circulation again builds up at the axial connector 101 and the valve body 104 again closes under the action of the spring 105. It then also closes the steam valve 52.

As in the embodiment of FIGS. 7 to 9 in FIG. 10 the steam feed begins before the admission of condensate and next is shut off after closing the condensate inlet valve 99 so that, before and after spraying of the condensate, the spraying device is rinsed with steam.

I claim:

1. A method of making a molded article from a mass of polystyrene particles, comprising the steps of:
   (a) introducing said mass of polystyrene particles into a two-part mold enclosing said particles in a mold cavity defined by wall portions forming steam compartments externally of said cavity;
   (b) hearing said particles through said wall portions by feeding steam into said steam compartments thereby expanding said particles and forming condensate in said steam compartments;
   (c) fusing particles of said mass expanded in step (b) with each other by introducing steam into said cavity; and
   (d) stabilizing an article formed by fusion of the expanded particles with each other by:
   ($d_1$) excavating steam from said steam compartments and from said cavity,
   ($d_2$) collecting condensate from said steam compartments,
   ($d_3$) venting said steam compartments,
   ($d_{3'}$) heating said condensate to a temperature at most equal to a boiling temperature of said condensate but at least 10° K. less than said boiling temperature while venting said steam compartments in step ($d_3$), and
   ($d_4$) spraying condensate collecting in step ($d_2$) and heated in step ($d^{3'}$) against surfaces of said wall portions defining said compartments and opposite surfaces thereof facing said cavity at an ambient pressure of said steam compartments and at said temperature.

2. The method defined in claim 1 wherein said temperature, with which said condensate is brought to said back surfaces is no less than 2° K. below said boiling point determined by said pressure in said steam compartments.

3. The method defined in claim 1 wherein said condensate is collected from condensation in said process at least a portion of said condensate so collected is used for cooling of said mold wall portions.

4. The method defined to claim 1 wherein additionally to a portion of said condensate condensed on said back surfaces of said mold wall portions on depressurization of said steam compartments and collected, another portion of said condensate adjusted to said boiling temperature or said temperature less than said boiling temperature is sprayed on said back surfaces of said mold wall portions.

5. The method defined in claim 4 wherein in said cooling said condensate is applied to said back surfaces of said mold wall portions facing said steam compartments and said condensate is continuously sprayed on said back surfaces of said mold wall portions which are above a temperature which exists in said mold on removing said molded article from said mold.

6. The method defined in claim 1 wherein at least some of said condensate used for evaporation during cooling of said mold wall portions is obtained by collection and retention of said condensate collected on said back surfaces of said mold wall portions facing said steam compartment during a process step of said process prior to said cooling and is again directly evaporated from there during said cooling.

7. The method defined in claim 6 wherein only said condensate condensed on said back surfaces is used for cooling.

8. The method defined in claim 1 wherein said condensate which is released from said back surfaces of said mold wall portions occurring in said steam compartments is collected and at least some of said condensate thus released provided for evaporation is sprayed on said back surfaces facing said steam compartment of said mold wall portions.

9. The method defined in claim 6 wherein said condensate released from said back surfaces of said mold wall portions occurring in said steam compartment is drawn off, collected and during cooling of said mold wall portions is adjusted to a temperature at or just below said boiling temperature corresponding to said pressure occurring in said steam compartments on said back surfaces of said mold wall portions and said condensate adjusted in said temperature by said steam is sprayed in said steam compartment on said rear surfaces of said mold wall portions to be cooled.

10. The method as defined in claim 9 wherein during operation of a plurality of foam molding units said condensate arising in all of said foam molding units is collected centrally, processed centrally and according to the requirements of said cooling is distributed to individual ones of said foam molding units.

11. The method as defined in claim 9 wherein said condensate collected is at least partially prepared from fresh ones of said portions of said condensate produced from said steam.

12. The method defined in claim 1 wherein a plurality of cooling medium feed pipes to said steam compartments are kept continuously filled with said condensate and by circulation through a heat exchanger said condensate is kept at a temperature at or slightly less than said boiling temperature of said condensate at another of said pressures suitable for said spraying when not being used for said cooling.

13. The method as defined in claim 1 wherein on making said molded article from said expandable polystyrene particles said mold wall portions are cooled to a temperature between about 70° C. and 80° C. and at the beginning of said cooling process said condensate is sprayed at a temperature at 98° C. to 100° C. on said back surfaces facing said steam compartments, while the absolute value of said pressure in said steam compartment is about 1 bar.

14. The method defined in claim 1 wherein during cooling said back surfaces of said mold wall portions said condensate to be sprayed is sprayed with said pressure at 2.5 to about 3 bar in said steam compartment and thus in said steam compartments during said cooling an absolute pressure of about 200 mbar to 300 mbar is produced by evacuating from atmospheric pressure.

15. The method defined in claim 1, further comprising a step of evacuating condensate and steam formed in said cavity upon terminating the step ($d_4$).

* * * * *